United States Patent [19]
Kaya et al.

[11] Patent Number: 4,459,818
[45] Date of Patent: Jul. 17, 1984

[54] SUPERVISORY CONTROL OF CHILLED WATER TEMPERATURE

[75] Inventors: Azmi Kaya, Akron; Michael S. Willey, Chagrin Falls, both of Ohio

[73] Assignee: The Babcock & Wilcox Company, New Orleans, La.

[21] Appl. No.: 498,376

[22] Filed: May 26, 1983

[51] Int. Cl.³ .................. F25D 17/02; F25B 41/04
[52] U.S. Cl. .................................. 62/201; 62/210; 62/224; 62/230
[58] Field of Search ............... 62/98, 99, 118, 185, 62/201, 230, 204, 208, 209, 210, 211, 215, 217, 222, 223, 224, 225, 226, 227; 165/22; 236/1 B

[56] References Cited

U.S. PATENT DOCUMENTS

| | | | |
|---|---|---|---|
| 3,204,423 | 9/1965 | Resh, Jr. | 62/230 X |
| 3,499,297 | 3/1970 | Ruff et al. | 62/226 X |
| 4,201,061 | 5/1980 | Heffernan | 62/201 X |
| 4,270,361 | 6/1981 | La Barge | 62/201 X |
| 4,282,718 | 8/1981 | Kountz et al. | 62/201 X |
| 4,429,541 | 2/1984 | Kamejima et al. | 62/185 X |

Primary Examiner—Harry B. Tanner
Attorney, Agent, or Firm—Vytas R. Matas; Robert J. Edwards

[57] ABSTRACT

An arrangement and method of controlling optimum chilled water temperature supplied to a process by a pump, the water being chilled by coolant in a coolant cycle having a compressor and a load valve, comprises first and second sensors for sensing a supply and a return temperature to and from the process. A value is obtained for the amount of work done by the pump and the compressor with that value as well as the supply and return temperature values being supplied to a supervisory control. The supervisory control operates to generate a reference temperature which is a function of the supply temperature but which is either above or below the supply temperature depending on a ratio between the difference in work and a change in the difference between the supply and return temperatures. When the ratio is about zero this indicates the difference between supply and return temperature is at an optimum and the reference temperature is the same as the supply temperature. When the ratio is negative, the reference temperature is below the supply temperature and when the ratio is positive the reference temperature is above the supply temperature. The reference temperature is used in a temperature controller which is connected to the load valve for adjusting the setting of the valve according to a load demand signal which is chosen to be either the reference temperature if that is less or a demand value which depends on the amount of demand necessary for the process.

10 Claims, 6 Drawing Figures

SUPERVISORY CONTROL OF CHILLED WATER TEMPERATURE

FIELD AND BACKGROUND OF THE INVENTION

The present invention relates in general to the temperature control of chilled water to be used in one or more processes, and in particular to a new and useful arrangement for optimizing the chilled water temperature.

A refrigeration cycle is utilized to chill water for use in one or more processes. The cycle includes an evaporator through which water to be chilled is passed and in which expanding coolant is utilized to draw heat from the water. The coolant is supplied to the evaporator over a coolant circuit containing a compressor, a condenser, and a control valve for controlling the amount of cooling effect.

FIG. 1 shows a graph plotting the heat content of the coolant, that is the enthalpy thereof, against the coolant pressure. Coolant is expanded in the evaporator from point 3 to point 4 which results in coolant evaporation from point 4 to point 1. Compression takes place from point 1 to point 2 and condensation of coolant from point 2 to point 3.

To conserve energy, it is desirable to optimize chilled water temperature by critically controlling the flow of coolant and the use of power in the coolant cycle as well as the chilled water cycle.

Supervisory control of optimum chilled water temperature is normally implemented by computers and extensive computer programs. Analog devices can also be utilized, however the expected performance of these devices suffers. Accuracy and flexibility are reduced, for example. Analog devices further cannot optimize the control operation.

Computers, on the other hand, require high-level language which takes relatively long to process within the computer. In addition, highly trained personnel are needed to program and to operate the computer devices. These all result in high costs.

SUMMARY OF THE INVENTION

The present invention provides a performance level in the supervisory control of chilled water temperature which is equivalent to that which computers can deliver. The cost however, is low and is comparable to that of analog devices. The invention also does not have the disadvantages of a relatively long processing time. Its speed is faster than that of computers and is also comparable to that of analog devices. The advantages of analog devices and computers are thus combined in the present invention.

The main concept of the invention is to increase the chilled water supply temperature as long as the efficiency is increased or the cost of cooling per unit refrigeration, "ton", is decreased. The logic control of the invention stops changing the chilled water temperature when an optimum condition is obtained.

Accordingly, an object of the invention is to provide an arrangement for the optimized control of chilled water temperature supplied to at least one process by pump means, the water being chilled by coolant in a coolant cycle having compressor means and load valve means, comprising, a first temperature sensor for sensing a supplied temperature of water to the process, a second temperature sensor for sensing a return temperature of water from the process, work determining means connected to pump and compressor means for determining a total amount of work needed to chill and supply the water to the process, supervisory control means connected to the temperature sensors and the work determining means for generating a reference temperature which is a function of the supply temperature and a ratio $\Delta W/\Delta(\Delta T)$, where $\Delta W$ is a change in the total amount of work with time and $\Delta(\Delta T)$ is a change in the difference between supply and return temperature, the reference temperature being equal to the supply temperature when $\Delta W/\Delta(\Delta T)$ is about zero, being less than the supply temperature when that ratio is negative and being more than the supply temperature when the ratio is positive, and temperature control means connected to the supervisory control means for receiving the reference temperature, the first temperature sensor for receiving the supply temperature, the process for receiving the demand value and the load valve, for controlling the load valve according to a load demand signal which corresponds to the difference between the supply temperature and the lowest of the reference temperature and the demand value.

Another object of the invention is to provide a method of optimizing the control of chilled water temperature by controlling the supply temperature to produce an optimum difference between the supply and return temperatures which corresponds to a minimum total amount of work needed to chill and supply the water.

A still further object of the invention is to provide such an arrangement and method which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 2:
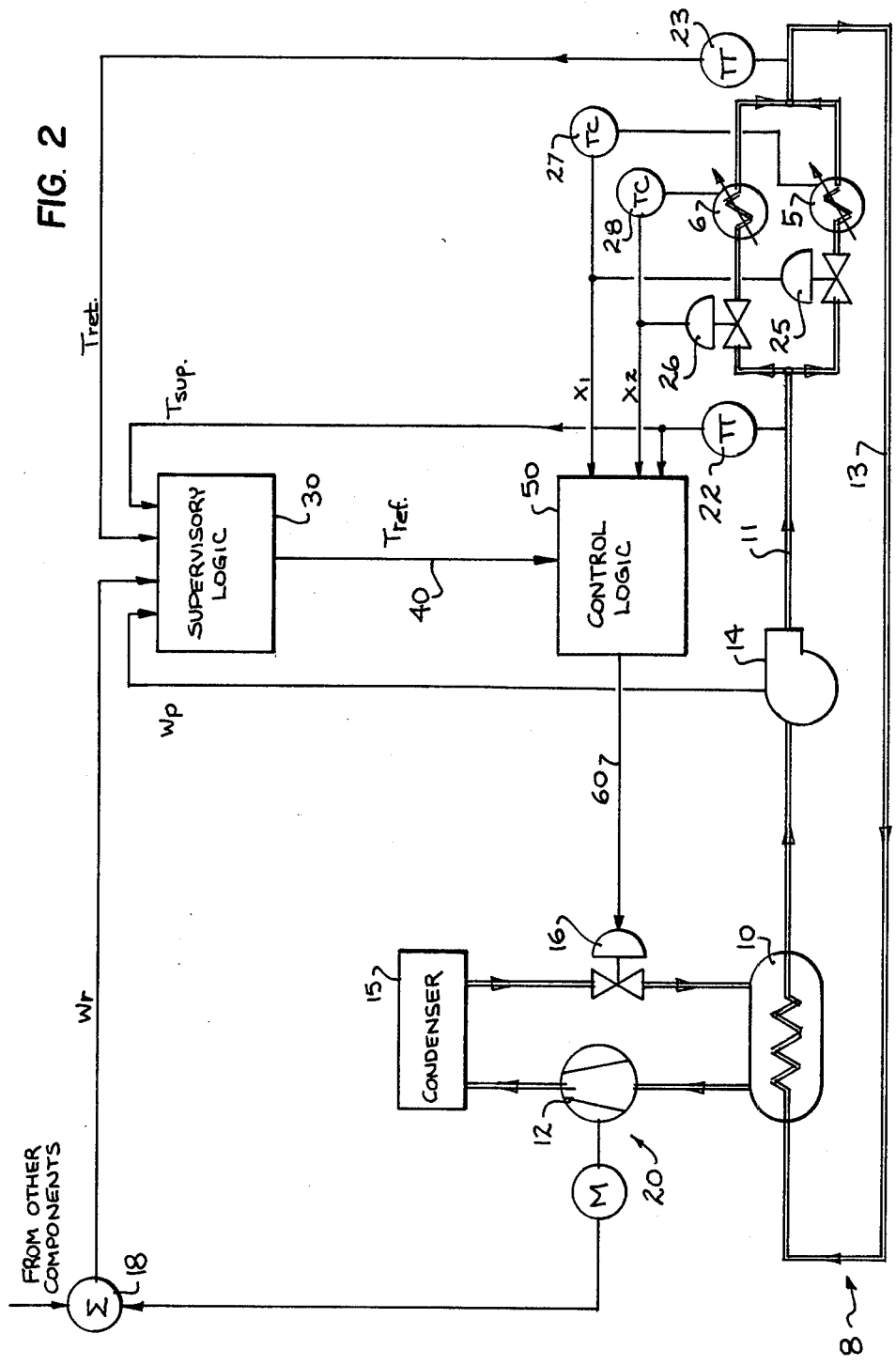
FIG. 2 is a schematic diagram illustrating the arrangement of the invention.

Referring to the drawings in particular, the invention embodied therein in FIG. 2 is an arrangement for the optimized control of chilled water supplied to two processes shown schematically at 5 and 6, over a chilled water cycle 8. The chilled water cycle includes evaporator 10, a pump 14, a supply line 11 and a return line 13. In known fashion, the evaporator is connected to a coolant cycle 20 having a compressor 12 for compressing expanded and evaporated cooling from evaporator 10, supplying it to a condenser 15 and returning it over a load valve 16 to the evaporator.

Each process 5,6 includes a process valve 25 and 26 respectively for passing a selected amount of chilled water from the chilled water cycle 8 to the process. TC controllers 27 and 28 control respective valves 25 and 26 and also supply demand signals $x_1$ and $x_2$ to a temperature control unit 50, to be described later.

A first temperature sensor 22 is connected to the chilled water feed line 11 for sensing supply temperature $T_{sup}$. A second temperature sensor 23 is connected to the return line 13 for supplying a return temperature $T_{ret}$. The supply temperature is provided to temperature control unit 50 as well as to a supervisory control unit 30 which will also be described later. Also supplied to the supervisory control unit 30 is the return temperature value as well as work values $W_r$ and $W_p$. The work value $W_p$ is the amount of work generated by pump 14 and the value $W_r$ is the total amount of additional work required by the coolant cycle 20 as well as other peripheral work utilizing devices such as cooling towers, other pumps and fans. This total value of additional work is determined in a summing unit 18.

Figure 3:
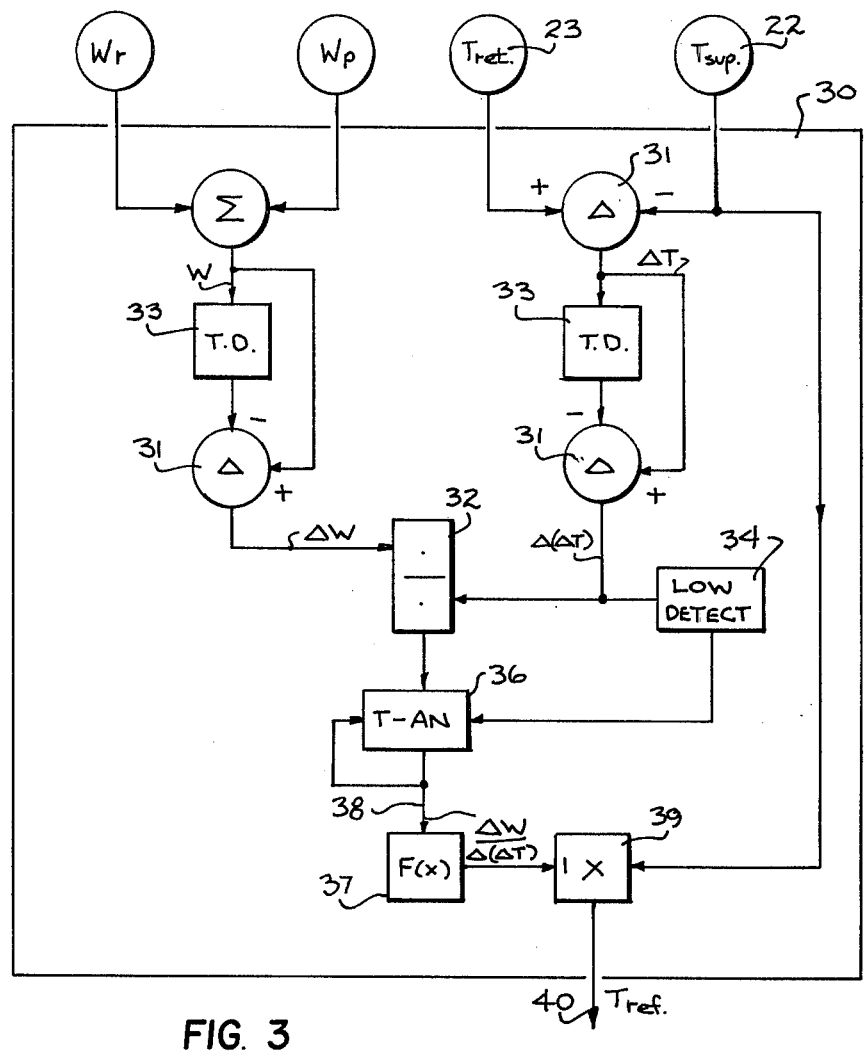
FIG. 3 is a block diagram showing details of the supervisory control logic circuit of the invention.

Referring to FIG. 3, numeral 31 designates comparators which generate values equal to a difference between two inputs thereto. Numeral 33 designates time delays which are utilized to obtain a difference value over time.

In this way, a difference between supply and return temperature, $\Delta T$ is obtained which is read at two distinct times to obtain a difference in this temperature difference or $\Delta(\Delta T)$. This value is supplied as the denominator in a division unit 32. The numerator corresponds to the difference in total work used in chilling and supplying the chilled water to the one or more processes, designated $\Delta W$. Where the difference in temperature change falls below a second limit, a low detector 34 provides a further signal to a calculator unit 36 to be used for a bumpless transfer in generating the ultimate value $\Delta W/\Delta(\Delta T)$ on line 38. A function generator 37 is utilized to produce either a value 1, a value less than 1 or a value greater than 1 on its output and provide this value to a multiplier 39. This value is then multiplied by the supply temperature from sensor 22 and generates a reference temperature $T_{ref}$ on line 40. Line 40 is connected to the temperature control logic unit 50 which produces a load demand signal that control load valve 16 according to the optimum chilled water temperature.

Figure 5:
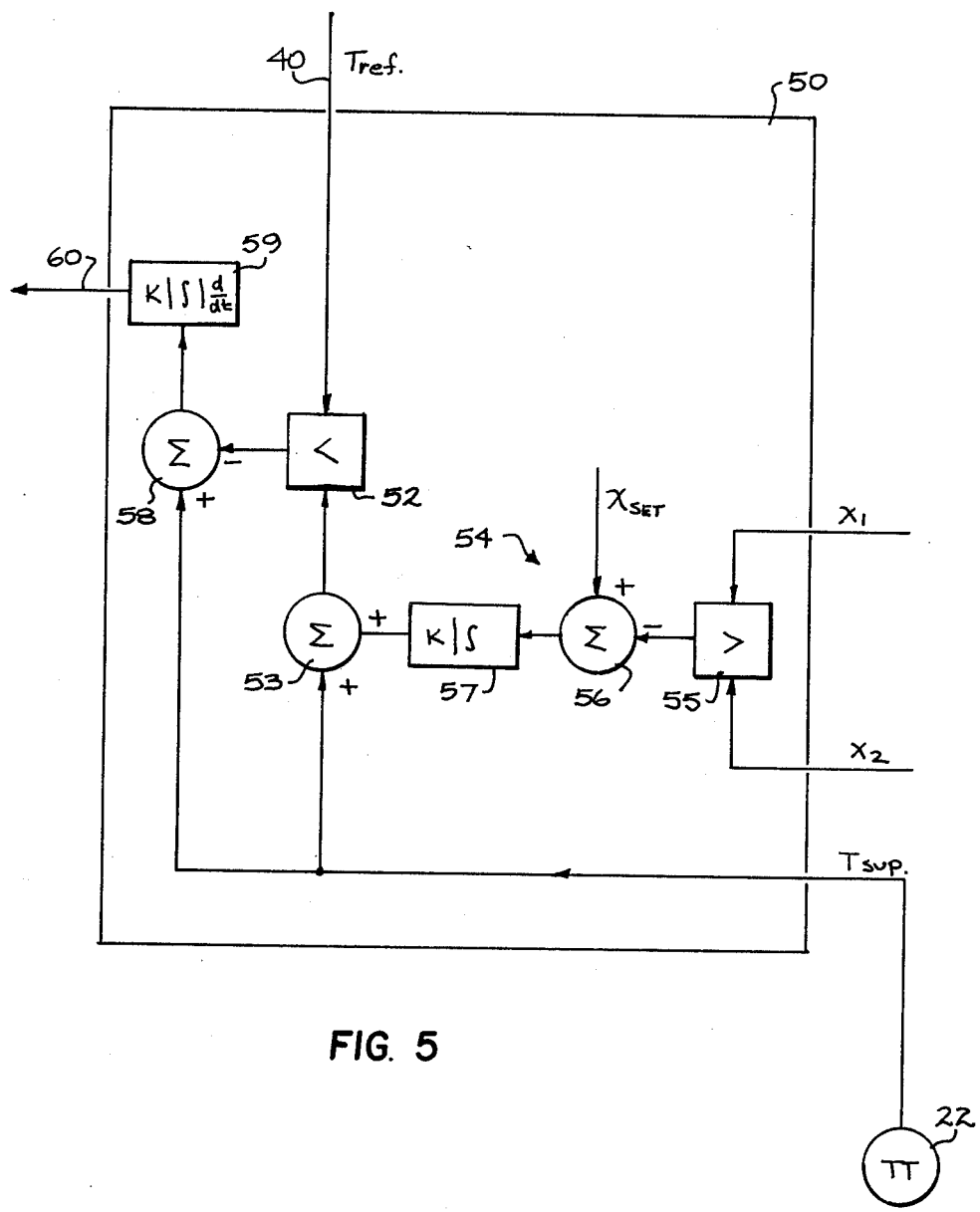
FIG. 5 is a block diagram of a control logic circuit for controlling a load demand valve of the coolant circuit illustrated in FIG. 2.

FIG. 5 shows details of the temperature control logic unit 50. A low selector 52 receives the reference temperature value from supervisory control unit 30 and selects either that value or a value from summing unit 53, if that value is lower. Summing unit 53 receives two inputs, one from supply temperature sensor 22 and the other from a load demand arrangement generally designated 54. Load demand arrangement 54 includes a high selector 55 which is connected to receive valve control signals $x_1$ and $x_2$ and select the greater value, designating greater valve opening position. This value is subtracted in summing unit 56 from a set value $x_{set}$, corresponding to a 90% open position. The resulting value is supplied over a PI controller 57 to one input of the summing unit 53. $X_{set}$ is a manually-set signal indicative of maximum opening of valves (described by valve control signals $x_1$ and $x_2$).

The output of low selector 52 corresponds to a temperature set point $T_{set}$ or bias which is applied to a further summing unit 58 and subtracted from the supply temperature $T_{sup}$. This difference corresponds to the optimum set point which is available over PID controller 59, on line 60 leads to the load valve 16 for the coolant flow.

Figure 1:
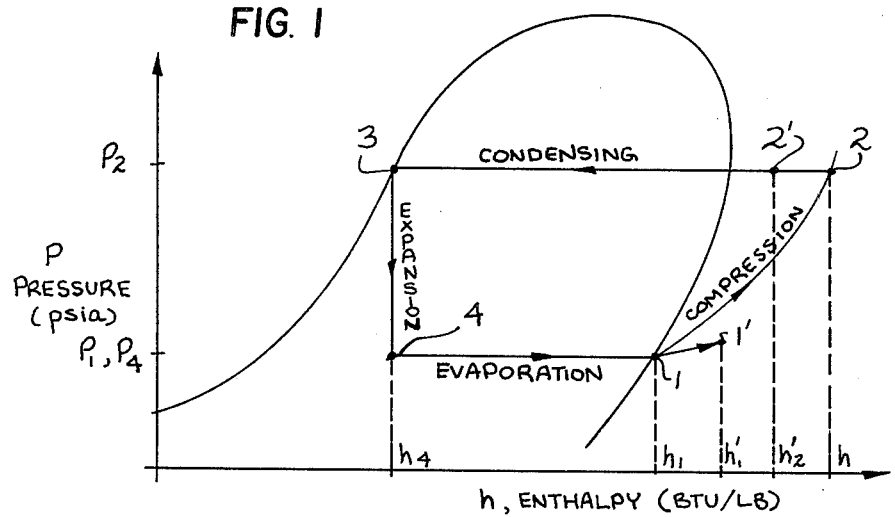
FIG. 1 is a graph of a cooling cycle plotting enthalpy against pressure in the cooling cycle.
Figure 4:
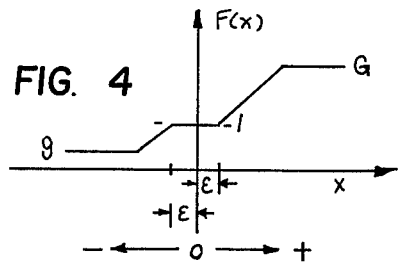
FIG. 4 is a graph illustrating the function F(x) utilized to generate a reference temperature in the logic circuit of FIG. 3.
Figure 6:
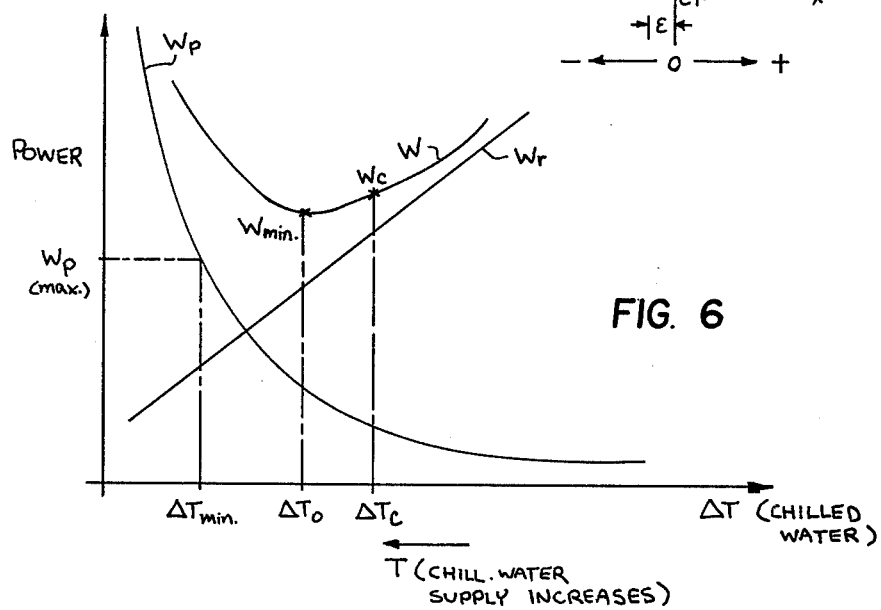
FIG. 6 is a graph illustrating the optimum temperature difference between supply and reference temperatures for the chilled water circuit, and its relationship to the work expended in various parts of the arrangement.

The structures illustrated in FIGS. 2, 3 and 4 as well as the graphs of FIGS. 1, 4 and 6 will now be utilized to explain the operation of the invention.

Referring once more to FIG. 1, the coefficient performance (COP), a measure of efficiency, is:

$$COP = \frac{\text{Refrigeration Output}}{\text{Power Input}} = \frac{h_1 - h_4}{h_2 - h_1} \quad (1)$$

An increase in chilled water temperature leaving the evaporator 10 increases the temperature (an enthalpy) entering the compressor 12 (point 1'). Assuming everything remains the same, the COP' will be $$COP' = \frac{h_1' - h_4}{h_2 - h_1'} \quad (2)$$

It turns out that COP'>COP as shown in the following calculations.

Typical values for the chilled water cycle are:

$h_1 = 70.7$ Btu/lb; $P_1 = 5.4$ psia $h_4 = 17.34$ Btu/Lb; $P_4 = 5.4$ psia $h_2 = 87.29$ Btu/Lb; $P_2 = 51.94$ psia So that:

$$COP = \frac{70.7 - 17.34}{87.29 - 70.7} = \frac{53.36}{16.59} = 3.22 \quad (3)$$

Increase $T_1$ by 10° F. (point 1'), $h_1' = 72$, and:

$$COP' = \frac{72 - 17.34}{87.29 - 72} = \frac{54.66}{15.29} = 3.57 \quad (4)$$

thus:

$$\frac{\Delta COP}{COP} = \frac{COP' - COP}{COP} = 0.108 \quad (5)$$

There is a 1.08% increase in COP for each °F. of temperature. That is, $(\Delta COP/COP) = 0.0108 \Delta T$. A simplified equation for % decrease of power input (KW) can be written for % increase of COP:

$$\frac{-\Delta KW}{KW} \approx \frac{\Delta COP}{COP} = 0.0108 \Delta T \quad (6)$$

which leads to:

$$\frac{(\Delta KW/KW)}{\Delta T} = -0.0108 \quad (7)$$

The values of $(\Delta KW/KW)\Delta T$ can be calculated from measurements and can be updated.

EXAMPLE

Consider a chiller with a 1400 ton capacity and using the inventive arrangement. The temperature of the chilled water is increased by 10° F. The energy cost is $5/10^6$ Btu. COP=3.22; compressor and driving efficiency is n=0.72. Annual energy cost per ton=$(12000/3.22)8000/0.72(5/10^6)=\$206$. Annual saving=$206(1400)(0.0108)(10)=\$31,147$.

Alternately, using equation (7):

$$\text{Annual Saving} = \Delta KW(3412)\,8000\,\frac{5}{10^6}$$

$$= .0108(10)\frac{1400}{3.22}\frac{12000}{3412}\left[(3412)\frac{8000}{.72}\frac{5}{10^6}\right]$$

$$= \$31,147.$$

The control strategy of the invention is that the chilled water temperature is maximized while all users of the refrigeration plant are satisfied. This is done by keeping the most open valve of chilled water at 90 percent open. The 10 percent safety factor is left for operational safety and can be adjusted. There are other factors which may limit the maximization of this temperature. This would be supervisory setting due to a higher level optimization. In that case the maximum chilled water temperature will be dictated by this value rather than the most open valve position.

As the chilled water supply temperature $T_{sup}$ is increased for improved efficiency while the return chilled water temperature $T_{ret}$ remains at its maximum allowable limit, the temperature difference, $\Delta T$, is reduced. This means an increased flow to increase the overall heat transfer coefficient for the same load conditions. However, increased flow means increased pumping cost. An optimum trade-off exist between the increased cost of pumping and the decreased cost of refrigeration (mainly the compressor). The supervisory control of the invention adjusts the amount of chilled water temperature increase as shown in FIG. 5 ($T_{ref}$).

The efficiency of a refrigeration system is defined as the ratio of heat removed $Q_c$, to the work W, required to remove the heat, or:

$$n = Q_c/W = n_e n_c \quad (8)$$

where;
$n_e$=equipment efficiency
$n_c$=cycle efficiency.

However, the cycle efficiency $n_c$ can be expressed $$n_c = \frac{T_r - T_o}{T_o} = \frac{\Delta T_r}{T_o} \quad (9)$$

where;
$T_r$=Temperature (of coolant or refrigerant) at the condenser
$T_o$=Temperature (of refrigerant) at the evaporator.
Combining the terms:

$$W_r = \frac{Q_c}{n} = \left(\frac{Q_c}{n_e T_o}\right)\Delta T_r = K_l \Delta T_r \quad (10)$$

As $\Delta T_r$ is decreased by increasing the chilled water temperature W is decreased, as expected, for given load and environment.

On the other hand, pump power can be described as $$W_p = C_p m h \quad (11)$$

where,
$C_p$=constant
m=mass flow
h=head
Knowing that $m = k\sqrt{h}$, $W_p$ becomes $$W_p = Km^3 \quad (12)$$

For the heat transfer $Q_e$ in the evaporator:

$$Q_e = C_e m \Delta T_w \quad (13)$$

where,
$C_e$=Constant
$\Delta T$=Temperature difference of chilled water supply and return
Substituting into equation (12):

$$W_p = K\left(\frac{Q_e C_e}{\Delta T}\right)^3 = K_p\left(\frac{1}{\Delta T}\right)^3 \quad (14)$$

As the chilled water supply temperature is increased for a given chilled water return temperature, $\Delta T$ is decreased. This relation established a direct proportion between $\Delta T_r$ and $\Delta T$ and $\Delta T_r$ can be replaced by $\Delta T$, leading to:

$$W = W_r + W_p = K_r \Delta T + K_p(1/\Delta T)^3 \quad (15)$$

The curves of W, $W_r$, $W_p$ are shown in FIG. 6. Conventional values are $W_c$, $\Delta T_c$ for the total power and the temperature difference respectively. As $\Delta T$ decreases, an optimum $\Delta T$ is obtained at $\Delta T_0$ corresponding to $W_{min}$. At this point, $T_{ref}$ is obtained to regulate the control logic of chilled water temperature optimization.

Note that without supervisory control $\Delta T$ will stop at $\Delta T_{min}$ by the limit of $W_{p(max)}$ for the pump which corresponds to a total W higher than $W_{min}$.

Control logic for the invention is shown in FIG. 3. Referring to FIG. 6, the general idea is to operate about the $\Delta T_0$ area for minimized power. If process load is reduced $\Delta T$ will be made smaller until $\Delta T_0$. The values of $\Delta W/\Delta(\Delta T)$ will be calculated by the control logic of FIG. 3 and whenever this value is about zero, F(x)=1, and $T_{ref}=T_{supply}$. See FIG. 4 which illustrates the function F(x). This will be the desired $\Delta T = \Delta T_0$. Now, examining FIG. 5, the low selector 52 will allow $T_{set}=T_{ref}$ preventing any increase in $T_{supply}$ if demand is low. However, if cooling demand is high and the other input of low selector becomes lower than $T_{ref}$, then the decrease in $T_{supply}$ is permitted. If $\Delta W/\Delta(\Delta T)$ from division unit 32 is positive ($\Delta T > \Delta T_0$) then F(X)=large number G (e.g. 3) and there is no effect from $T_{ref}$ to $T_{set}$. When $\Delta W/\Delta(\Delta T)$ is negative ($\Delta T < \Delta T_0$), F(x)=small number g (e.g. $\frac{1}{3}$), and $T_{ref}$ will be lower than the other signal at the low selector 52 and $\Delta T$ will be driven to $\Delta T_0$.

While a specific embodiment of the invention has been shown and described in detail to illustrate the application of the principles of the invention, it will be understood that the invention may be embodied otherwise without departing from such principles.

What is claimed is:

1. An arrangement for the optimized control of chilled water temperature supplied to at least one process by pump means, the water being chilled by coolant in a coolant cycle having compressor means and load valve means, comprising:

a first temperature sensor for sensing a supply temperature of the water to the process;

a second temperature sensor for sensing a return temperature of water from the process;

work determining means connected to the pump and compressor means for determining a total amount of work needed to chill and supply water to the process;

supervisory control means connected to said first and second temperature sensors and said work determining means for generating a reference temperature which is a function of supply temperature and the ratio $\Delta W/\Delta(\Delta T)$ where $\Delta W$ is a change in the total amount of work with time and $\Delta(\Delta T)$ is a change in the difference between supply and return temperature, the reference temperature being equal to the supply temperature when the ratio is approximately zero, being less than the supply temperature when the ratio is negative and being more than the supply temperature when the ratio is positive; and temperature control means connected to said supervisory control means for receiving the reference temperature, said temperature control means being connected to said first temperature sensor for receiving the supply temperature, to the process for receiving a demand value and to the load valve means, for controlling the load valve means according to a load demand signal which corresponds to the difference between the supply temperature and the lowest of the reference temperature and the demand value.

2. An arrangement according to claim 1, wherein said work determining means includes a summing unit connected to said compressor means and to additional work using elements other than said pump means for determining the total amount of work needed.

3. An arrangement according to claim 1, wherein said supervisory control means comprises a first comparator connected to said first and second temperature sensors for obtaining the difference $\Delta T$ between the supply and return temperature, a first delay unit connected to an output of said first comparator and a second comparator connected to an output of said first delay unit for comparing the difference in temperature at one time with the difference of temperature at a later time to obtain the difference value $\Delta(\Delta T)$.

4. An arrangement according to claim 3, wherein said work determining means includes a summing unit for summing work from the pump means and the compressor means, said supervisory control means including a second delay unit connected to an output of said summing unit and a third comparator connected to an output of said second delay unit for obtaining the change in the amount of total work $\Delta W$, a division unit for receiving the value $\Delta W$ and dividing it by the value $\Delta(\Delta T)$.

5. An arrangement according to claim 4, wherein said supervisory control means includes a function generator connected to an output of said division unit for generating a value equal to one when the ratio is approximately equal to zero, a value less than one when the ratio is negative and a value greater than one when the ratio is positive, and a multiplier connected to an output of said function generator and connected to said first temperature sensor for multiplying a value corresponding to the supply temperature by an output of said function generator to form said reference temperature, a line connected between said supervisory control means and said temperature control means for carrying said reference temperature to said temperature control means from said supervisory control means.

6. An arrangement according to claim 1, wherein the at least one process includes a process valve and a process valve controller for generating a valve setting, said temperature control means including a summing unit connected to said process valve controller and for receiving a valve set point corresponding to at least a 90% opening of a valve, said summing unit obtaining a difference between the set point and the setting of said process valve controller, a further summing unit connected to an output of said first mentioned summing unit and to said first temperature sensor for obtaining a temperature set value, a low selector connected to an output of said further summing unit and to said supervisory control means for receiving said reference temperature, said low selector selecting its lowest input and outputting said lowest input as a temperature set point, and a comparator connected to said low selector and to said first temperature sensor for obtaining a difference between said temperature set point and said supply temperature to form an optimum set point, said comparator connected to the load valve means for regulating the load valve means according to the optimum set point.

7. A method of controlling the temperature of chilled water to an optimum extent, which chilled water is supplied to at least one process by pump means, the water being chilled by a coolant in a coolant cycle having compressor means and load valve means, comprising:

sensing the supply temperature of chilled water to the process;

sensing the return temperature of chilled water from the process;

determining a total amount of work expended in chilling and supplying the chilled water to the process; and generating a reference temperature for use to control the load valve means as a function of a multiple of the supply temperature times a multiplication factor;

said multiplication factor being obtained on the basis of a ratio between a change in the total amount of work $\Delta W$ over a change in the difference between the supply and return temperature $\Delta(\Delta T)$, the multiplication factor being one when the ratio is about zero, less than one when the ratio is negative and more than one when the ratio is positive.

8. A method according to claim 7, including determining the total amount of work by adding the amount of work utilized to operate the pump means with the amount of work utilized to operate the compressor means.

9. A method according to claim 7, including obtaining the difference between the supply and return temperatures at one point of time, waiting a selected duration of time and obtaining the difference between the supply and return temperature at a second point in time, comparing the values obtained at the first mentioned and second point in time with each other to obtain the change in temperature difference $\Delta(\Delta T)$.

10. A method according to claim 7, including determining the total amount of work at a first point in time, waiting a time delay period and obtaining the total amount of work at a second point in time and comparing the amount of work at the first and second points in time to each other to obtain the change in total amount of work $\Delta W$.

* * * * *